United States Patent
Rai et al.

(10) Patent No.: US 11,655,184 B2
(45) Date of Patent: May 23, 2023

(54) GLASS-BASED ARTICLES WITH SECTIONS OF DIFFERENT THICKNESSES

(71) Applicant: CORNING INCORPORATED, Corning, NY (US)

(72) Inventors: Rohit Rai, Painted Post, NY (US); Ljerka Ukrainczyk, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 1077 days.

(21) Appl. No.: 16/150,816

(22) Filed: Oct. 3, 2018

(65) Prior Publication Data
US 2019/0106353 A1    Apr. 11, 2019

Related U.S. Application Data

(60) Provisional application No. 62/570,344, filed on Oct. 10, 2017.

(51) Int. Cl.
| | |
|---|---|
| *B32B 15/04* | (2006.01) |
| *B32B 17/06* | (2006.01) |
| *C03C 21/00* | (2006.01) |
| *C03C 3/087* | (2006.01) |
| *C03C 3/097* | (2006.01) |

(52) U.S. Cl.
CPC ............ *C03C 21/002* (2013.01); *C03C 3/087* (2013.01); *C03C 21/005* (2013.01); *C03C 3/097* (2013.01); *C03C 2201/40* (2013.01); *C03C 2201/50* (2013.01); *Y10T 428/315* (2015.01)

(58) Field of Classification Search
CPC .................................................. C03C 21/002
USPC ................................................... 428/410, 426
See application file for complete search history.

(56) References Cited

U.S. PATENT DOCUMENTS

| | | | |
|---|---|---|---|
| 8,312,739 B2 | 11/2012 | Lee et al. | |
| 8,561,429 B2 | 10/2013 | Allan et al. | |
| 2010/0009154 A1 | 1/2010 | Allan et al. | |
| 2010/0035038 A1 | 2/2010 | Barefoot et al. | |
| 2012/0236526 A1* | 9/2012 | Weber | C03C 21/002 65/30.14 |
| 2013/0224492 A1 | 8/2013 | Bookbinder et al. | |
| 2015/0147575 A1* | 5/2015 | Dejneka | C03C 21/002 501/63 |

(Continued)

FOREIGN PATENT DOCUMENTS

| | | |
|---|---|---|
| CN | 103476727 A | 12/2013 |
| CN | 104870393 A | 8/2015 |

(Continued)

OTHER PUBLICATIONS

JP2017048090 English Machine translation.*

(Continued)

*Primary Examiner* — Lauren R Colgan
(74) *Attorney, Agent, or Firm* — Jeffrey A. Schmidt

(57) ABSTRACT

Glass-based articles having sections of different thicknesses where a maximum central tension in a thinner section is less than that of a thicker section. The articles comprise an alkali metal oxide having a independent nonzero concentrations that vary along at least a portion of the thickness of each section. Consumer electronic products may comprise the glass-based articles having sections of different thicknesses.

18 Claims, 9 Drawing Sheets

(56) References Cited

U.S. PATENT DOCUMENTS

| | | | |
|---|---|---|---|
| 2015/0368153 A1* | 12/2015 | Pesansky | C03C 3/097 428/220 |
| 2016/0057787 A1 | 2/2016 | Nakayasu | |
| 2017/0197384 A1 | 7/2017 | Finkeldey et al. | |
| 2017/0197876 A1 | 7/2017 | Oram et al. | |

FOREIGN PATENT DOCUMENTS

| | | | |
|---|---|---|---|
| CN | 107108337 | A | 8/2017 |
| CN | 210103771 | U | 2/2020 |
| JP | 2017-048090 | A | 3/2017 |
| JP | 2017-173852 | A | 9/2017 |
| TW | 201341324 | A | 10/2013 |
| TW | 201350449 | A | 12/2013 |
| TW | 201733954 | A | 10/2017 |
| WO | 2017/123596 | A1 | 7/2017 |
| WO | 2019/049958 | A1 | 3/2019 |

OTHER PUBLICATIONS

International Search Report and Written Opinion PCT/US2018/055019 dated Jan. 4, 2019, 15 pgs.

Japanese Patent Application No. 2020-520264, Office Action dated Jul. 8, 2022, 4 pages (English Translation Only), Japanese Patent Office.

Indian Patent Application No. 202017016273, First Examination Report dated Nov. 17, 2021, 7 pages Original Document Only; Indian Patent Office.

Chinese Patent Application No. 201811178456.1, Office Action dated Apr. 24, 2022, 5 pages (English Translation Only), Chinese Patent Office.

Taiwanese Patent Application No. 107135541, Notice of Allowance dated Jan. 22, 2022, 3 pages (English Translation Only); Taiwanese Patent Office.

* cited by examiner

GLASS-BASED ARTICLES WITH SECTIONS OF DIFFERENT THICKNESSES

CROSS-REFERENCE TO RELATED APPLICATIONS

This application claims the benefit of priority of U.S. Provisional Application Ser. No. 62/570,344 filed on Oct. 10, 2017, the contents of which are relied upon and incorporated herein by reference in their entirety.

FIELD

Embodiments of the disclosure generally relate to glass-based articles having sections of different thicknesses and methods for manufacturing the same.

BACKGROUND

Glass-based articles are used in many various industries including consumer electronics, transportation, architecture, defense, medical, and packaging. For consumer electronics, glass-based articles are used in electronic devices as cover plates or windows for portable or mobile electronic communication and entertainment devices, such as mobile phones, smart phones, tablets, video players, information terminal (IT) devices, laptop computers, navigation systems and the like. In architecture, glass-based articles are included in windows, shower panels, and countertops; and in transportation, glass-based articles are present in automobiles, trains, aircraft, and sea-craft. Glass-based articles are suitable for any application that requires superior fracture resistance but thin and light-weight articles. For each industry, mechanical and/or chemical reliability of the glass-based articles is typically driven by functionality, performance, and cost. Improving the mechanical and/or chemical reliability of these articles is an ongoing goal.

Chemical treatment is a strengthening method to impart a desired/engineered stress profile having one or more of the following parameters: compressive stress (CS), depth of compression (DOC), and maximum central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

In the consumer electronics industry, chemically-strengthened glass is used as a preferred material for display covers due to better aesthetics and scratch resistance compared to plastics, and better drop performance plus better scratch resistance compared to non-strengthened glass. In the past, thickness of cover glass has been mostly uniform (except near the edges). But recently, there has been interest in cover glass designs of non-uniform thicknesses away from the edges.

There is a need for chemically-strengthened glass articles having non-uniform thicknesses.

SUMMARY

Aspects of the disclosure pertain to glass-based articles having sections of different thicknesses and methods for their manufacture.

According to aspect (1), a glass-based article is provided. The glass-based articles comprising: a first section having a first thickness ($t_1$) and a first section surface; a second section having a second thickness ($t_2$), and a second section surface, wherein $t_2$ is less than $t_1$, a first stress profile of the first section comprising: a first compressive stress region; and a first central tension region comprising a first maximum central tension ($CT_1$); a second stress profile of the second section comprising: a second compressive stress region; and a second central tension region comprising a second maximum central tension ($CT_2$); and an alkali metal oxide having a first non-zero concentration that varies in the first section from the first section surface into at least a portion of $t_1$ and a second non-zero concentration that varies in the second section from the second section surface into at least a portion of $t_2$; wherein $CT_2$ is less than $CT_1$.

According to aspect (2), the glass-based article of aspect (1) is provided, including a soda-lime silicate, an alkali-aluminosilicate, an alkali-containing borosilicate, an alkali-containing aluminoborosilicate, or an alkali-containing phosphosilicate.

According to aspect (3), the glass-based article of aspect (2) is provided, including a lithium-containing aluminosilicate.

According to aspect (4), the glass-based article of any one of aspects (1) to (3) is provided, wherein the second section is off-set from all edges of the glass-based article.

According to aspect (5), the glass-based article of any one of aspects (1) to (4) is provided, wherein $t_2$ is less than $t_1$ by at least 100 microns.

According to aspect (6), the glass-based article of any one of aspects (1) to (5) is provided, wherein $t_2$ is in the range of $0.05 \cdot t_1$ to $0.96 \cdot t_1$.

According to aspect (7), the glass-based article of any one of aspects (1) to (6) is provided, wherein $t_1$ is in the range of 0.3 mm to 2.5 mm, and $t_2$ is in the range of 0.025 mm to 2.4 mm.

According to aspect (8), the glass-based article of any one of aspects (1) to (7) is provided, wherein the first stress profile further comprises a first depth of compression ($DOC_1$) that is located at $0.15 \cdot t_1$ or deeper.

According to aspect (9), the glass-based article of aspect (8) is provided, wherein $DOC_1$ is in the range of $0.15 \cdot t_1$ to $0.23 \cdot t_1$.

According to aspect (10), the glass-based article of any one of aspects (1) to (9) is provided, wherein the second stress profile further comprises a second depth of compression ($DOC_2$) that is located at $0.075 \cdot t_2$ or deeper.

According to aspect (11), the glass-based article of aspect (10) is provided, wherein $DOC_2$ is in the range of $0.075 \cdot t_2$ to $0.15 \cdot t_2$.

According to aspect (12), the glass-based article of any one of aspects (1) to (11) is provided, wherein the first stress profile further comprises a first surface compressive stress ($CS_1$) in the first compressive stress region of 450 MPa or more; and the second stress profile further comprises a second surface compressive stress ($CS_2$) in the second compressive stress region of 450 MPa or more.

According to aspect (13), the glass-based article of any one of aspects (1) to (12) is provided, wherein a portion of the first stress profile extends from the first section surface to a knee, wherein the knee is located at a depth from the first section surface in the range of about 2 to about 30 micrometers, and all points of the first stress profile located between the first section surface and the knee comprise a tangent having a value that is 10 MPa/micrometer or greater.

According to aspect (14), the glass-based article of aspect (13) is provided, wherein a portion of the first stress profile extends from the knee to a first depth of compression ($DOC_1$), wherein all points of the first stress profile located between the knee and $DOC_1$ comprise a tangent having a value that is between about 0 and 2 MPa/micrometer.

According to aspect (15), the glass-based article of any one of aspects (1) to (14) is provided, wherein the alkali metal oxide comprises one or more of: lithium, potassium, and sodium.

According to aspect (16), the glass-based article of any one of aspects (1) to (15) is provided, further comprising one or more metals selected from the group consisting of: silver, copper, zinc, titanium, rubidium, and cesium.

According to aspect (17), a consumer electronic product is provided. The consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover plate disposed over the display; wherein a portion of at least one of the housing and the cover plate comprises the glass-based article of one of aspects (1) to (16).

According to aspect (18), a method of manufacturing a glass-based article is provided. The method comprising: exposing a first section having a first thickness ($t_1$) and a first section surface and a second section having a second thickness ($t_2$) and a second section surface of a glass-based substrate to a bath comprising alkali metal ions to ion-exchange the glass-based substrate and form the glass-based article comprising an alkali metal oxide having a first non-zero concentration that varies in the first section from the first section surface into at least a portion of $t_1$ and a second non-zero concentration that varies in the second section from the second section surface into at least a portion of $t_2$; wherein $t_2$ is less than $t_1$, and the glass-based article has a first stress profile of the first section comprising a first central tension region comprising a first maximum central tension ($CT_1$) and a second stress profile of the second section comprising a second central tension region comprising a second maximum central tension ($CT_2$), wherein $CT_2$ is less than $CT_1$.

According to aspect (19), the method of aspect (18) is provided, wherein the glass-based substrate is exposed to a first bath comprising alkali metal ions for a first duration, and subsequently to a second bath comprising alkali metal ions for a second duration.

According to aspect (20), the method of aspect (18) is provided, wherein the glass-based substrate is a lithium-containing aluminosilicate and the bath comprises ions of potassium and sodium.

BRIEF DESCRIPTION OF THE DRAWINGS

The accompanying figures, which are incorporated in and constitute a part of this specification, illustrate several embodiments described below.

DETAILED DESCRIPTION

Figure 2:
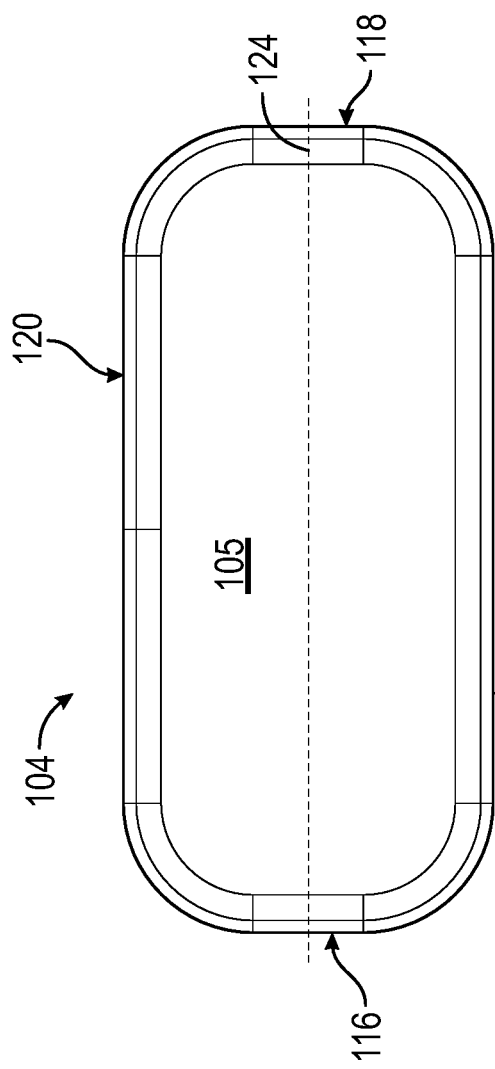
FIG. 2 illustrates a pocket of an article.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

The terms "glass-based article" and "glass-based substrates" are used to include any object made wholly or partly of glass, including glass-ceramics (including an amorphous phase and a crystalline phase). Laminated glass-based articles include laminates of glass and non-glass materials, such as laminates of glass and crystalline materials. Glass-based substrates according to one or more embodiments may be selected from soda-lime silicate glass, alkali-alumino silicate glass, alkali-containing borosilicate glass, alkali-containing aluminoborosilicate glass, and alkali-containing phosphosilicate.

A "base composition" is a chemical make-up of a substrate prior to any ion exchange (IOX) treatment. That is, the base composition is undoped by any ions from IOX.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant, such as amounts less than 0.01 mol %.

Unless otherwise specified, all compositions described herein are expressed in terms of mole percent (mol %) on an oxide basis.

A "stress profile" is stress with respect to position of a glass-based article or any portion thereof. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress or, in some situations where the tensile stress is specifically identified, as an absolute value. Central tension (CT) refers to tensile stress in a central region or central tension region of the glass-based article. Maximum central tension (maximum CT or $CT_{max}$) occurs in the central tension region, and often is located at 0.5·h, where h is the article thickness. For the present disclosure of articles having first and second sections of different thicknesses, a first thickness ($t_1$) and a second section having a second thickness ($t_2$), respectively, a first maximum central tension ($CT_1$) in the first section is nominally at 0.5·$t_1$, and a second maximum central tension ($CT_2$) in the second section is nominally at 0.5·$t_2$. Reference to "nominally" at 0.5·h, at 0.5·$t_1$, and at 0.5·$t_2$ allows for variation from exact center of the location of the maximum tensile stress.

A "knee" of a stress profile is a depth of an article where the slope of the stress profile transitions from steep to gradual. The knee may refer to a transition area over a span of depths where the slope is changing.

A non-zero alkali metal oxide concentration that varies along at least a substantial portion of the article thickness (h), the first section thickness ($t_1$), or the second section thickness ($t_2$) indicates that a stress has been generated in the article, first section, or second section, respectively, as a result of ion exchange. The variation in metal oxide concentration may be referred to herein as a metal oxide concentration gradient. The metal oxide that is non-zero in concentration and varies along a portion of the thickness may be described as generating a stress in the glass-based article. The concentration gradient or variation of one or more metal oxides is created by chemically strengthening a glass-based substrate in which a plurality of first metal ions in the glass-based substrate is exchanged with a plurality of second metal ions.

Unless otherwise specified, CT and CS are expressed herein in megaPascals (MPa), whereas thickness and DOC are expressed in millimeters or microns (micrometers).

CS and DOC are measured using those means known in the art, such as by scattering polarimetry using a SCALP-5 measurement system from Glasstress (Estonia). Other possible techniques for measuring CS and DOC include a surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to those methods known in the art, such a Procedure C (Glass Disc Method) described in ASTM standard C770-16, entitled "Standard Test Method for Measurement of Glass Stress-Optical Coefficient," the contents of which are incorporated herein by reference in their entirety.

State-of-the-art ion exchange (IOX) of alkali-containing glass has focused on glass-based articles of uniform thickness. Glass-based articles, however, are now being designed with non-uniform thicknesses in areas away from the edges. One exemplary application is to have a recess in a glass-based cover to house a fingerprint sensor to replace a traditional through-hole or-slot for receipt of the fingerprint sensor. By housing the fingerprint sensor in strengthened glass, traditional polymeric fingerprint sensor covers are eliminated, allowing for improved scratch resistance and better user experience because there are no protruding or slotted features on the cover glass. When substrates with non-uniform thicknesses in areas away from the edges are chemically strengthened under state-of-the art IOX methods, thinner sections can have higher central tension (CT) than the thicker sections. The higher CT in the thinner sections can be detrimental to the reliability of the final glass-based article and, in many cases, can make it frangible, which is a problem that was not previously recognized.

Glass-based articles disclosed herein are advantageous in that they have sections of different thicknesses in combination with a stress profile that includes a first central tension in a first section having a first thickness and a second central tension in a second section having a second thickness, wherein the second thickness is less than the first thickness, and the second central tension is less than the first central tension. The glass-based articles are formed from substrates having one or more alkali metals in a base composition, the substrates being exposed to ion exchange such that the articles comprise one or more ion-exchanged metals. The one or more ion-exchanged metals may comprise one or more of: lithium, potassium, and sodium. Further ion-exchanged metals may comprise one or more metals selected from the group consisting of: silver, copper, zinc, titanium, rubidium, and cesium.

Glass-based substrates may be strengthened by single-, dual-, or multi-step ion exchange (IOX). Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," in which glass is strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

In the glass-based articles, there is an alkali metal oxide having a non-zero concentration that varies independently in both the first section along at least a portion of the $t_1$ and the second section along at least a portion of the $t_2$. The stress profiles in each section are generated due to the non-zero concentration of the metal oxide(s) that varies along a portion of each thickness. In some embodiments, the concentration of a metal oxide is non-zero and varies, both along a thickness range from about 0·($t_1$ or $t_2$) to about 0.3·($t_1$ or $t_2$). In some embodiments, the concentration of the metal oxide is non-zero and varies along a thickness range from about 0·($t_1$ or $t_2$) to about 0.35·($t_1$ or $t_2$), from about 0·($t_1$ or $t_2$) to about 0.4·($t_1$ or $t_2$), from about 0·($t_1$ or $t_2$) to about 0.45·($t_1$ or $t_2$), from about 0·($t_1$ or $t_2$) to about 0.48·($t_1$ or $t_2$), or from about 0·($t_1$ or $t_2$) to about 0.50·($t_1$ or $t_2$). The variation in concentration may be continuous along the above-referenced thickness ranges. Variation in concentration may include a change in metal oxide concentration of about at least about 0.2 mol % along a thickness segment of about 100 micrometers. The change in metal oxide concentration may be at least about 0.3 mol %, at least about 0.4 mol %, or at least about 0.5 mol % along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the metal oxide decreases from the first surface of the first or second section to a point between the first surface and the second surface and increases from the point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius. For example, where a single Na- and K-containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, to the size of the monovalent ions that are exchanged into the glass for smaller monovalent ions. In such glass-based articles, the area at or near the surface comprises a greater CS due to the greater amount of larger ions (i.e., K+ ions) at or near the surface. Furthermore, the slope of the stress profile typically decreases with distance from the surface due to the nature of the concentration profile achieved due to chemical diffusion from a fixed surface concentration.

In one or more embodiments, the metal oxide concentration gradient extends through a substantial portion of the thicknesses $t_1$ or $t_2$ or the entire thicknesses $t_1$ or $t_2$ of the sections. In some embodiments, the concentration of the metal oxide may be about 0.5 mol % or greater (e.g., about 1 mol % or greater) along the entire thickness of the first and/or second section, and is greatest at a first surface and/or a second surface 0·($t_1$ or $t_2$) and decreases substantially constantly to a point between the first and second surfaces. At that point, the concentration of the metal oxide is the least along the entire thickness $t_1$ or $t_2$; however the concentration is also non-zero at that point. In other words, the non-zero concentration of that particular metal oxide extends along a substantial portion of the thickness $t_1$ or $t_2$ (as described herein) or the entire thickness $t_1$ or $t_2$. The total concentration of the particular metal oxide in the glass-based article may be in the range from about 1 mol % to about 20 mol %.

The concentration of the metal oxide may be determined from a baseline amount of the metal oxide in the glass-based substrate ion exchanged to form the glass-based article.

Figure 1:
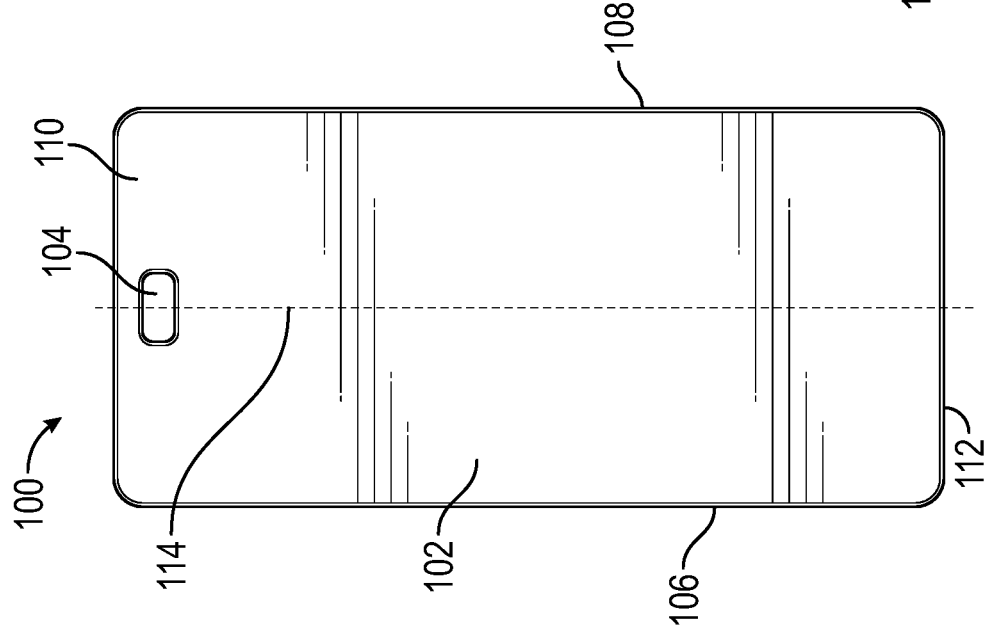
FIG. 1 illustrates an exemplary glass-based article.

Turning to the figures, FIG. 1 illustrates a glass-based article 100 having a non-uniform thickness away from edges. First section 102 has a first thickness ($t_1$) and a first maximum central tension ($CT_1$). Line 114 designates a midline of the article 100. Second section 104 has a second thickness ($t_2$) and a second maximum central tension ($CT_2$). Generally, the difference between $t_1$ and $t_2$ is at least 100 microns. In one or more embodiments, the $t_1$ is greater than the $t_2$ by at least 100 microns. The $t_2$ may be in the range of 0.05·$t_1$ to 0.96·$t_1$. In one or more embodiments, the $t_2$ is reduced by about 20% relative to $t_1$, or by about 30%, about 40%, about 50%, about 60%, about 70%, about 80%, about 90%, about 95%, and all values and subranges therebetween. The $t_1$ may be in the range of 0.3 mm to 2.5 mm, and all values and subranges therebetween; and the $t_2$ may be in the range of 0.025 mm to 2.4 mm, and all values and subranges therebetween. $CT_2$ is less than the $CT_1$, which is advantageous for ensuring the second section is not frangible despite having been ion exchanged under the same conditions as the first section. While the figures depict a single section having a thickness different from the rest of the article, it is noted that there may be multiple sections or pockets of different depths in the same article.

In this embodiment, the second section 104 is off-set from all edges 106, 108, 110, and 112 of the article 100. That is, second section 104 does not intersect any of the edges 106, 108, 110, 112.

Figure 3:
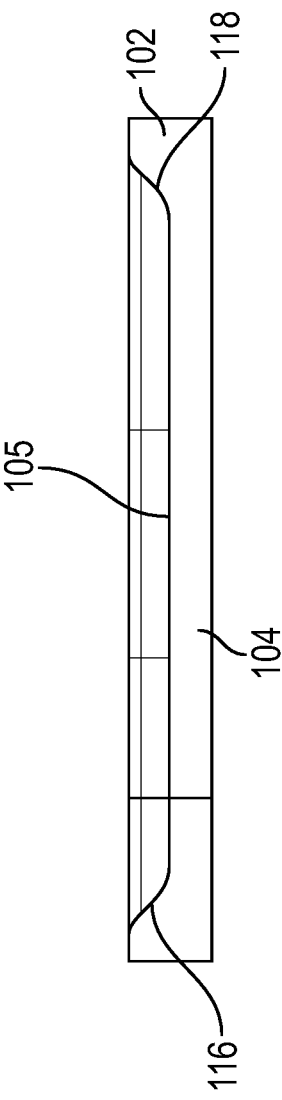
FIG. 3 illustrates a cross-section of the pocket of FIG. 2.

FIG. 2 illustrates the second section 104 being defined by sides 116, 118, 120, and 122. In this embodiment, the second section 104 is a thin pocket designed to accommodate a fingerprint sensor or the like. Line 124 designates a centerline of the second section 104. FIG. 3 illustrates a cross-section of the article 100 along line 124 of FIG. 2. Sides 116, 118, 120, and 122 provide a transition from a body 105 of the second section 104 to the first section 102. In some embodiments, the article has a size of 141.4 millimeters by 68.4 millimeters and the first section is 0.6 millimeters thick. In some embodiments, the pocket has a size of 5.6 millimeters by 12.3 millimeters and the second section is 0.3 millimeters thick.

Figures 4A, 4B:
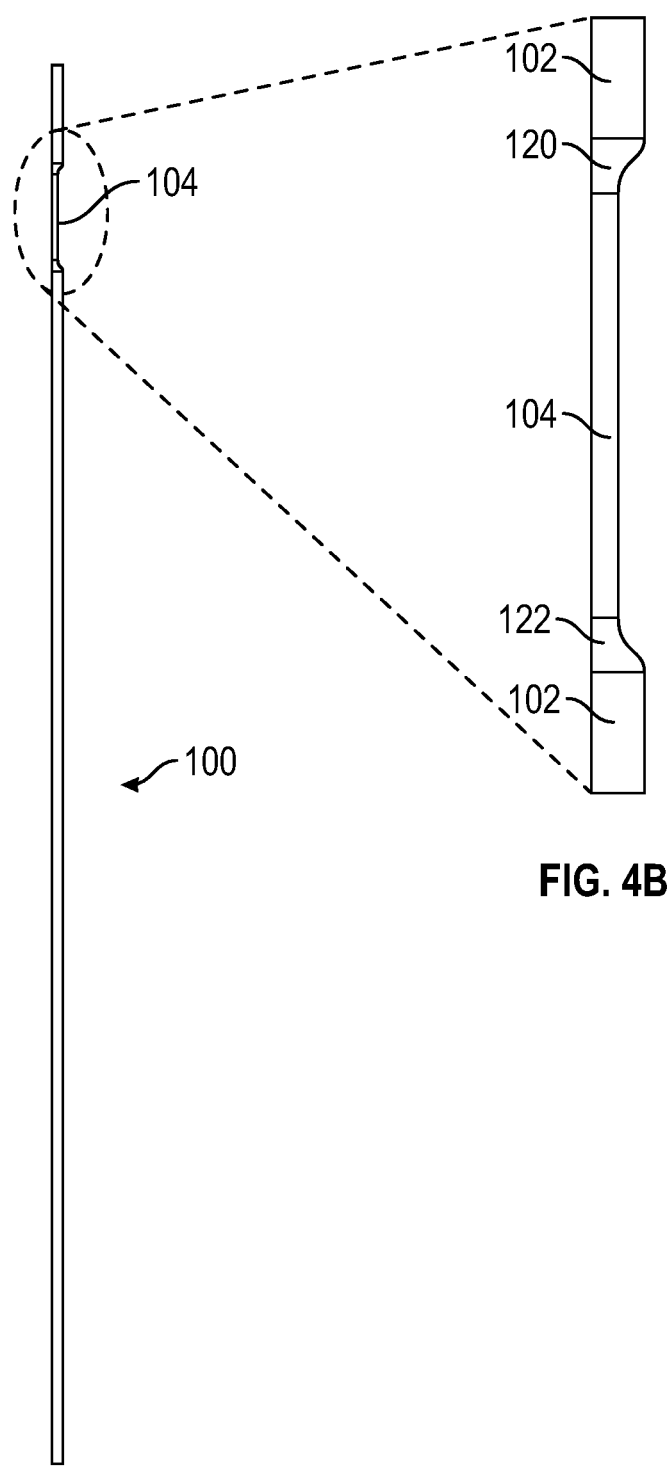
FIG. 4A illustrates a cross-section of the article of FIG. 1.
FIG. 4B illustrates a close-up cross-section of a portion of the article of FIG. 1 with a different thickness.

FIG. 4A illustrates a cross-section of the article 100 along midline 114 of FIG. 1 and the location of second section 104. FIG. 4B illustrates a close-up of the cross-section of the second section 104 having sides 120 and 122 which transition to the first section 102.

Figure 5A:
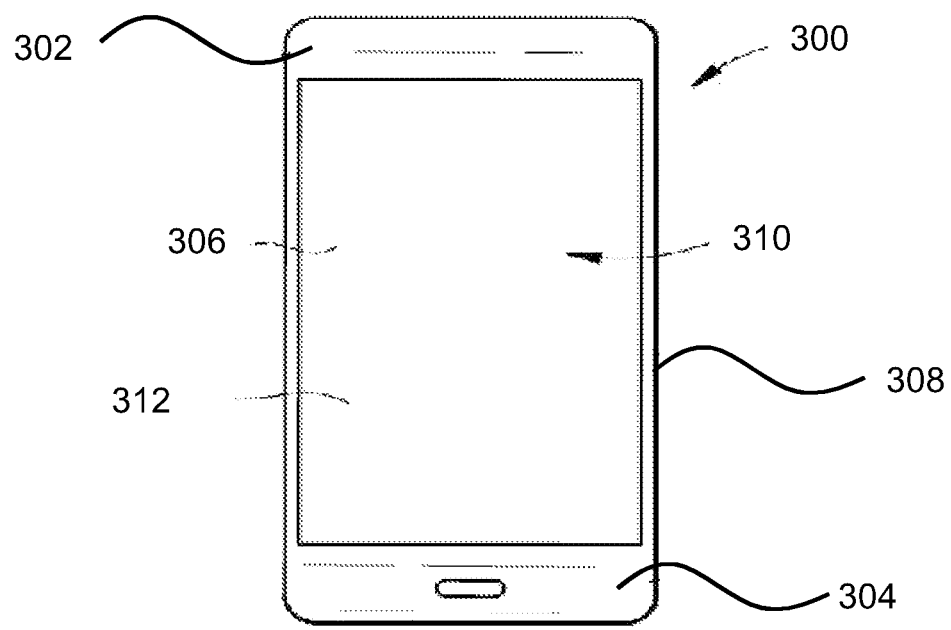
FIG. 5A is a plan view of an exemplary electronic device incorporating any of the strengthened laminated glass-based articles disclosed herein.
Figure 5B:
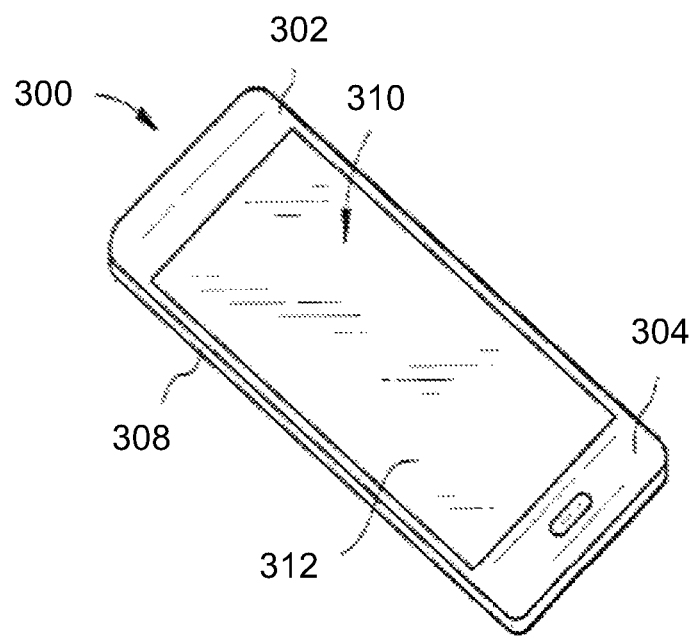
FIG. 5B is a perspective view of the exemplary electronic device of FIG. 5A.

The glass-based articles disclosed herein may be incorporated into another article such as an article with a display (or display articles) and/or a housing (e.g., consumer electronics, including mobile phones, tablets, computers, navigation systems, and the like), architectural articles, transportation articles (e.g., automobiles, trains, aircraft, seacraft, etc.), appliance articles, or any article that requires some transparency, scratch-resistance, abrasion resistance or a combination thereof. An exemplary article incorporating any of the strengthened articles disclosed herein is shown in FIGS. 5A and 5B. Specifically, FIGS. 5A and 5B show a consumer electronic device 300 including a housing 302 having front 304, back 306, and side surfaces 308; electrical components (not shown) that are at least partially inside or entirely within the housing and including at least a controller, a memory, and a display 310 at or adjacent to the front surface of the housing; and a cover plate 312 at or over the front surface of the housing such that it is over the display. In some embodiments, the at least a portion of cover plate 312 may include any of the strengthened articles disclosed herein. In some embodiments, at least a portion of the housing 302 may include any of the strengthened articles disclosed herein.

Glass-based substrates may be provided using a variety of different processes. For example, exemplary glass-based substrate forming methods include float glass processes and down-draw processes such as fusion draw and slot draw. A glass-based substrate prepared by floating molten glass on a bed of molten metal, typically tin to produce a float glass characterized by smooth surfaces and uniform thickness. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further, annealed to reduce internal stress, and optionally polished.

Down-draw processes produce glass-based substrates having a uniform thickness that possess relatively pristine surfaces. Because the average flexural strength of the glass-based substrate is controlled by the amount and size of surface flaws, a pristine surface has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Exemplary base compositions of substrates may comprise but are not limited to: a soda-lime silicate, an alkali-alumino silicate, an alkali-containing borosilicate, an alkali-containing aluminoborosilicate, or an alkali-containing phosphosilicate. Glass-based substrates may include a lithium-containing aluminosilicate.

Examples of glasses that may be used as substrates may include alkali-alumino silicate glass compositions or alkali-containing aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size.

In an embodiment, the base glass composition comprises a soda lime silicate glass. In embodiment, the soda lime silicate glass composition is, on an oxide basis: 73.5 wt. % $SiO_2$, 1.7 wt. % $Al_2O_3$, 12.28 wt.-% $Na_2O$, 0.24 wt. % $K_2O$, 4.5 wt. % MgO, 7.45 wt. % CaO, 0.017 wt. % $ZrO_2$, 0.032 wt. % $TiO_2$, 0.002 wt. % $SnO_2$, 0.014 wt. % SrO, 0.093 wt. % $Fe_2O_3$, 0.001 wt. % $HfO_2$, 0.028 wt. % Cl oxide(s), and 0.203 wt. % $SO_3$.

In a particular embodiment, an alkali-alumino silicate glass composition suitable for the substrates comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma modifiers) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma modifiers) > 1$.

In still another embodiment, the substrates may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq (SiO_2+B_2O_3+CaO) \leq 69$ mol. %; $(Na_2O+K_2O+B_2O_3+MgO+CaO+SrO) > 10$ mol. %; 5 mol. % $< (MgO+CaO+SrO) \leq 8$ mol. %; $(Na_2O+B_2O_3) - Al_2O_3 < 2$ mol. %; 2 mol. % $< Na_2O - Al_2O_3 < 6$ mol. %; and 4 mol. % $< (Na_2O+K_2O) - Al_2O_3 \leq 10$ mol. %.

In an alternative embodiment, the substrates may comprise an alkali aluminosilicate glass. In an embodiment, the alkali aluminosilicate glass has a composition comprising: 2 mol. % or more of $Al_2O_3$ and/or $ZrO_2$, or 4 mol % or more of $Al_2O_3$ and/or $ZrO_2$.

In another embodiment, the substrates may comprise a lithium-containing alkali aluminosilicate glass. In an embodiment, the lithium-containing alkali aluminosilicate glass has a composition including, in mol %, $SiO_2$ in an amount in the range from about 60% to about 75%, $Al_2O_3$ in an amount in the range from about 12% to about 20%, $B_2O_3$ in an amount in the range from about 0% to about 5%, $Li_2O$ in an amount in the range from about 2% to about 8%, $Na_2O$ in an amount greater than about 4%, MgO in an amount in the range from about 0% to about 5%, ZnO in an amount in the range from about 0% to about 3%, CaO in an amount in the range from about 0% to about 5%, and $P_2O_5$ in a non-zero amount; wherein the glass substrate is ion-exchangeable and is amorphous, wherein the total amount of $Al_2O_3$ and $Na_2O$ in the composition is greater than about 15 mol %.

Chemical strengthening of glass substrates having base compositions is done by placing the ion-exchangeable glass substrates in a molten bath containing cations (K+, Na+, Ag+, etc) that diffuse into the glass while the smaller alkali ions (Na+, Li+) of the glass diffuse out into the molten bath. The replacement of the smaller cations by larger ones creates compressive stresses near the top surface of glass. Tensile stresses are generated in the interior of the glass to balance the near-surface compressive stresses. For a flat piece of glass of uniform thickness, stress ($\sigma(z)$) can be calculated from the concentration profile according to equation (I):

$$\sigma(z) = \frac{BE}{1-\nu}(C_{avg} - C(z)) = \frac{BE}{1-\nu}\left(\frac{1}{h}\int_0^h C(z)dz - C(z)\right). \quad (I)$$

where C(z) is the concentration of the large cations at z, $C_{avg}$ is the average concentration of the large cations in the article, h is the glass thickness, B is the network dilation coefficient, E is the Young's modulus, $\nu$ is the Poisson's ratio, and z is the co-ordinate in the thickness direction with values 0 and h at the surfaces of the article. Concentration of the larger ions is typically maximum at the surface and minimum at the mid-thickness. Near the surface, where $C(z) > C_{avg}$, stresses are compressive. When $C(z) = C_{avg}$, stress becomes zero, and this depth is referred to as the depth of compression (DOC). At greater depths, where $C(z) < C_{avg}$, stresses are tensile, and generally reach a maximum value at the mid-thickness of the article. This maximum value of tensile stress is referred to as the maximum central tension.

Glass-based substrates may be exposed to a first bath comprising alkali metal ions for a first duration, and subsequently to a second bath comprising alkali metal ions for a second duration. In a detailed embodiment, the glass-based substrate is a lithium-containing aluminosilicate and the bath comprises ions of potassium and sodium.

Higher compressive stresses (CS) are desired for better scratch resistance and drop performance. Higher DOC also improves drop performance, and is therefore preferred as well. However, higher CS and DOC lead to higher CT, which is undesirable for crack propagation and, if too high, can lead to frangibility of the sample.

Figure 6:
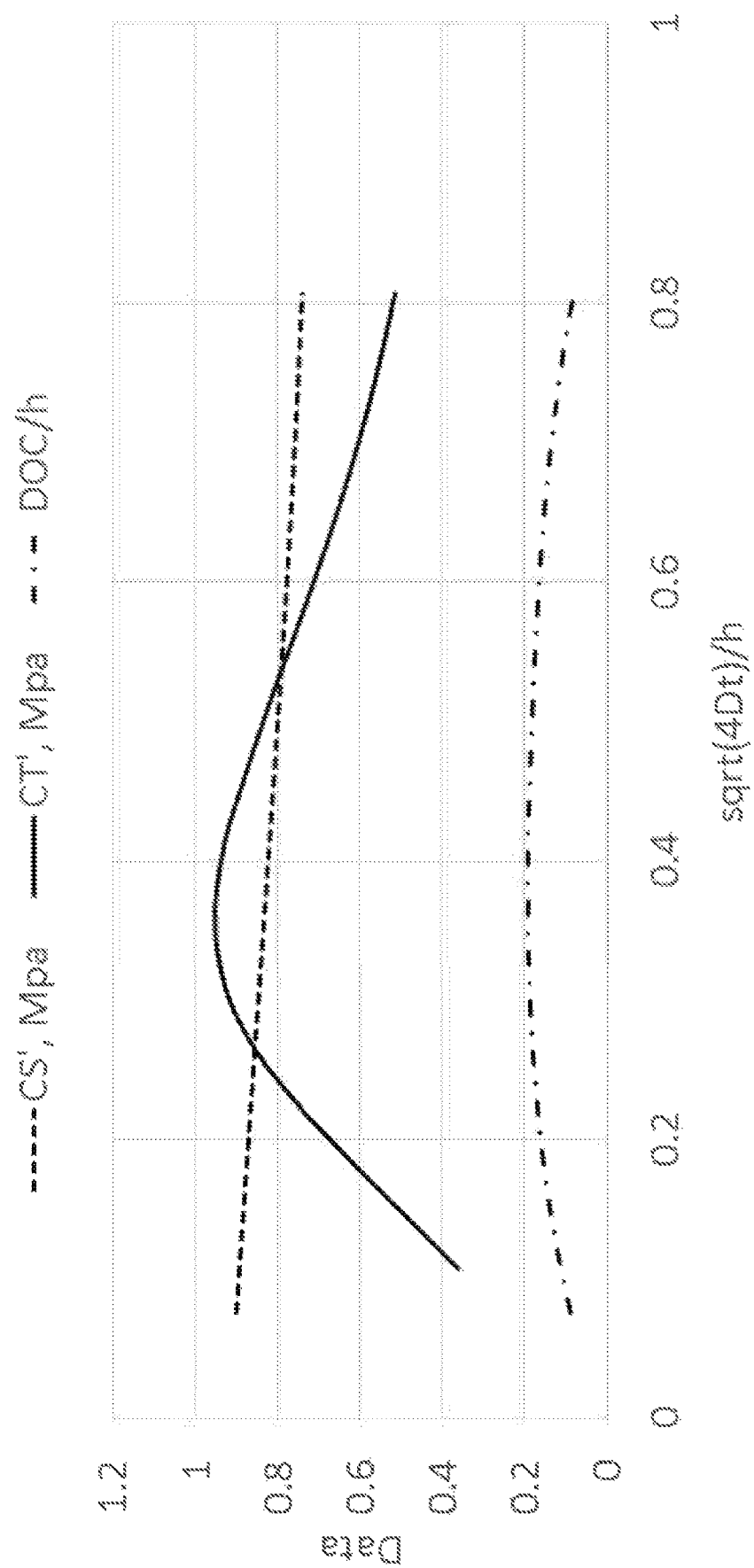
FIG. 6 is a graph of three parameters: compressive stress (CS), central tension (CT), and depth of compression (DOC) as a function of scaled diffusion distance.

FIG. 6 is a graph of three parameters: compressive stress (CS), maximum central tension (CT), and depth of compression (DOC) as a function of scaled diffusion distance, sqrt(4Dt)/h, with DOC being represented as a fraction of total thickness, h. D is the diffusivity and t is time. Trends are for a 1-step, 3-ion diffusion exchange where one exchange pair (Li—Na) provides the parabolic stress profile, and a second exchange pair (Na—K) provides the spike. When represented in this way, curves for glass articles of different thicknesses overlap. The precise shape of the curve depends on concentration dependence of diffusivity, pairs of ions exchanged (e.g. K+ for Na+, Na+ for Li+, etc), and number of IOX steps done at different bath compositions and/or temperatures. For example, addition of a short-depth high-slope high CS spike to an already IOX'd glass article typically reduces the DOC. The scale of the CS and CT curves in FIG. 6, on the other hand, are determined by the term $BE\Delta C/(1-\nu)$, where $\Delta C$ is the difference between the surface concentration and the concentration of the base substrate composition of the large cations. B is the network dilation coefficient and is dependent on the ion-exchange pairs, and E is the Young's modulus and is fixed for each glass composition. $\Delta C$ can be adjusted by changing the composition and temperature of the IOX bath. FIG. 6 shows the following trends.

Both DOC and CT first increase with the term sqrt(4Dt)/h, reach a maximum, and then decrease upon further ion-exchange. For a case of 1-step 2-ion exchange (not shown), the DOC vs sqrt(4Dt)/h would reach a stable value (~0.22). The decrease in DOC beyond the peak (in FIG. 6) is due to the effect of the spike. Compressive stress decreases monotonically with sqrt(4Dt)/h.

With respect to DOC, initially, as more and more ions diffuse into the glass, the location where $C(z)=C_{avg}$ gets pushed further towards the center. That is, DOC increases with IOX time. For 3-ion IOX, where one pair of ions (e.g. Li—Na) creates the deep or parabolic portion of the stress profile and another pair (e.g. Na—K) creates the spike as shown in FIG. 6, the DOC first reaches a plateau and then starts decreasing. Note that for infinite IOX time, concentration would be uniform everywhere. DOC would under such conditions eventually reach zero even for the 1 step 2-ion exchange.

As to CT, initially, an increase in IOX time leads to an increase in $C_{avg}$ without any increase in concentration at mid-thickness, $C(z=h/2)$. During this period, CT increases according to Equation I. However, as the ions start reaching the center, the rate of increase in $C_{avg}$ is exceeded by the rate of increase in $C(z=h/2)$. From this point onwards, CT starts decreasing. Thus, DOC and CT show similar trends (increasing at first, then decreasing, with IOX time), but the peaks for DOC and CT are reached at different IOX times.

Regarding CS, with an increase in IOX time, the average concentration in the glass steadily increases with little corresponding change in surface concentration. Therefore, surface CS decreases gradually with an increase in IOX time.

Figure 7:
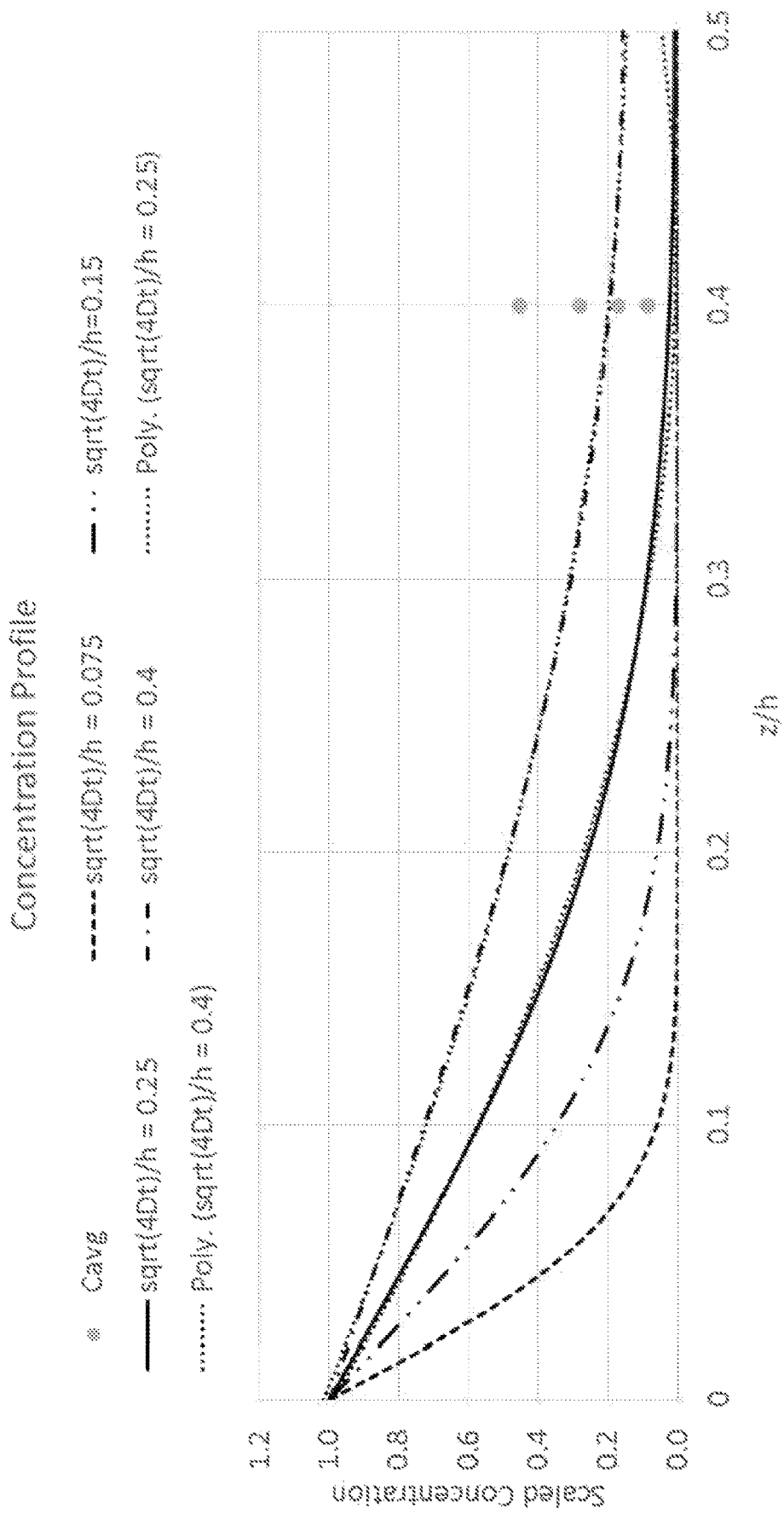
FIG. 7 is a graph of scaled concentration versus normalized position.

FIG. 7 is a graph of scaled concentration versus normalized position from the surface, for sqrt(4Dt)/h values of 0.075, 0.15, 0.25, and 0.40. Dashed lines show the average concentration (scaled) values for the curve of the corresponding sqrt(4Dt)/h value. Dotted lines represent the parabolic fit curves for sqrt(4Dt)/h=0.25 and 0.40. Intersection of solid curves with dashed lines represents the DOC. DOC increases with IOX time.

Figure 8:
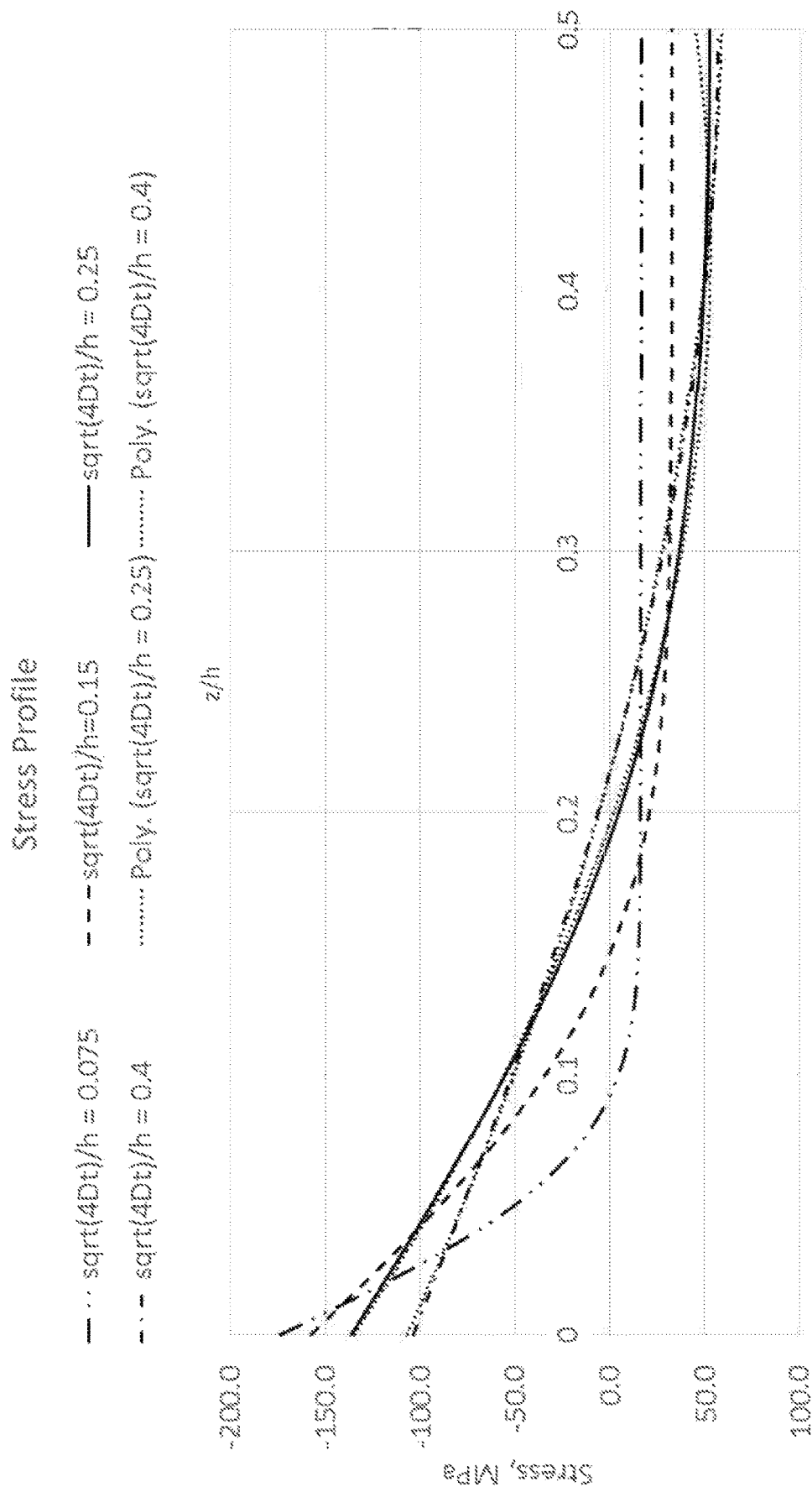
FIG. 8 is a graph of stress versus normalized position.

FIG. 8 is a graph of stress versus normalized position from the surface, for values of sqrt(4Dt)/h corresponding to those of FIG. 7. Parabolic fit curves for sqrt(4Dt)/h=0.25, 0.40 are also shown. For sqrt(4Dt)/h<0.25, ions from the surface have not reached the center of the glass. Up to this point, the concentration and stress profiles resemble a single error function (erfc) profile resulting from the solution of Fick's law of diffusion for short diffusion times. For sqrt (4Dt)/h<0.25, the solution of Fick's law involves addition of multiple erfc terms, and the resulting profile can be approximated by a parabolic equation $y=ax^2+bx+c$.

The graphs of FIGS. 7-8 are representative of 1-step ion-exchange processes with only one pair of exchanging species (Na+ for Li+, K+ for Na+, etc). However, these concepts can be applied to multi-pair and/or multi-step ion-exchange processes as well. A typical case may be of one pair of ion-exchange (e.g. Na+ with Li+) or first step accounting for the deep portion of ion-exchange and another pair (K+ with Na+) accounting for the steep surface spike.

When a glass article of non-uniform thickness (e.g., FIGS. 1-4) is IOX'd, all surfaces are exposed to substantially the same surface concentration at the same temperature. Thus, the values of parameters CS, DOC, and CT can be determined from the same curve. As the value of sqrt(4Dt)/h is higher for thinner sections of the glass, the CS, CT, and DOC values for the thinner section will be shifted towards the right (relative to thicker sections) of the curve in FIG. 6. Taking, for example, a first thickness of 0.6 mm and a second thickness of 0.3 mm, the sqrt(4Dt)/h value for the thin 0.3 mm section is twice the value for the thick 0.6 mm section. In this example, as the bulk of the article is 0.6 mm thick, it is desirable to have DOC at or close to peak of the curve. As peak CT is located to the left of peak DOC (FIG. 6), CT is either close to or already on the declining side of the curve. Therefore, for the 0.3 mm thick areas, CT value will be much lower than the peak. The same case holds for DOC, which is undesirable. However, for articles such as this, where the thinner areas are a small fraction of the thicker areas, having CT below the frangibility limit is more important than a slightly reduced DOC.

For designs where the area of thin sections is a significant fraction of the total area, DOC may be increased, while still maintaining CT below frangibility limits, by shifting to lower IOX times for a particular glass composition. This may decrease the DOC and/or CT in the thicker sections.

DOC in the thick sections may be >0.15h, and is preferably >0.18h. For the example of FIG. 6, this can be achieved by having $0.18<\sqrt{4Dt/h_1}<0.67$, and preferably $0.25<\sqrt{4Dt/h_1}<0.51$, where $h_1$ is the thickness of the thick section, and D is the diffusivity. DOC in the thin sections may be $>0.075\ h_2$, and is preferably greater than $0.1\ h_2$, where $h_2$ is the thickness of the thin section. For the example in FIG. 6, this can be achieved by having $0.07<\sqrt{4Dt/h_2}<0.85$. In another embodiment, the DOC in the thinnest section is >10 microns, and is preferably >20 microns.

For a particular IOX bath composition and temperature, IOX times can be calculated based on diffusivities of larger ions diffusing into the glass (K or Na) and maximum and minimum thicknesses of the article. DOC at the thickest section will determine the minimum IOX time and the DOC at thinnest section will determine the maximum IOX time, e.g. $0.0156h_1/D<t<0.18h_2/D$.

The surface CS in the thickest and thinnest sections may be >450 MPa, and preferably >650 MPa. CS can be adjusted by changing the concentration and temperature of the ion-exchange bath.

Maximum CT values in the thin section are below the frangibility limit.

Articles may have a high-slope (>10 MPa/um) region of the compressive stress profile near the surface extending over a depth of about 2-30 microns or about 5-20 um. A peak compressive stress of >450 MPa, and preferably >650 MPa, may be present at the surface. This region may be referred to as the spike.

A deep, low slope (<2 MPa/um) region of the compressive stress profile may extend from a depth of ~20-30 um to the center of the article. This region is characterized by a parabolic (stress=$az^2+bz+c$) or near-parabolic shape. The actual profile in this region may deviate somewhat due to various factors, such as concentration dependent diffusivity.

To form substrates having non-uniform thicknesses, a variety of processes may be used. A substrate of substantially uniform thickness may be obtained, where the thickness is the desired thickness of the first section. A second section of a thinner thickness may be formed in the first section of a thicker thickness by removal of a portion of the first section. Removal may be effected by mechanical treatment, such as machining, or by chemical treatment, such as etching, or by combinations of mechanical and chemical treatments. Substrates having non-uniform thicknesses may be formed by using a mold with a thin section designed therein. In some embodiments, the mold may be selected to produce the desired substrate profile with sections of difference thicknesses. In some embodiments, the molded substrate may in turn be subjected to further processing, such as machining, etching, or combinations thereof to form sections of different thicknesses.

The substrates of non-uniform thicknesses are then ion exchanged to form strengthened glass-based articles. The ion exchange conditions are selected to achieve a stress profile including a desired depth of compression (DOC) in the thick section while maintaining a central tension (CT) in the thin section to ensure the thin section is not frangible. Upon ion exchange of the substrate with non-uniform thickness, a glass-based article having sections of different thicknesses comprising a base composition and one or more ion-exchanged metals is formed.

Frangible behavior may be characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

In some embodiments, a first depth of compression ($DOC_1$) in the first section is located at $0.15 \cdot t_1$ or deeper. The $DOC_1$ may be in the range of $0.15 \cdot t_1$ to $0.23 \cdot t_1$, and all values and subranges therebetween.

In some embodiments, a second depth of compression ($DOC_2$) in the second section, the $DOC_2$ being located at $0.075 \cdot t_2$ or deeper. The $DOC_2$ may in the range of $0.075 \cdot t_2$ to $0.15 \cdot t_2$, and all values and subranges therebetween.

In some embodiments, the glass-based articles may have a surface compressive stress in the first section ($CS_1$) of 450 MPa or more, and a surface compressive stress in the second section ($CS_2$) of 450 MPa or more. $CS_1$ and $CS_2$ may independently be in the range of 450 MPa to 1.2 GPa, 700 MPa to 950 MPa, or about 800 MPa, and all values and subranges therebetween.

In some embodiments, the stress profile of the first section further comprises a compressive stress region extending from a first section surface or below to a knee in the range of about 2 to about 30 micrometers, wherein all points of the compressive stress region between the first section surface and the knee comprise a tangent having a value that is 10 MPa/micrometer or greater. The tangent value may be in the range of about 10 to about 500 MPa/micrometer, and all values and subranges therebetween.

In some embodiments, the stress profile in the first region further comprises an internal stress region extending from the knee that decreases such that all points of the internal stress region extending from the knee to a center of the article comprise a tangent having a value that is between about 0 and about 5 MPa/micrometer, and all values and subranges therebetween.

EXAMPLES

Various embodiments will be further clarified by the following examples. In the Examples, prior to strengthening, the Examples are referred to as "substrates". After being subjected to strengthening, the Examples are referred to as "articles" or "glass-based articles".

The following examples were designed and stress profiles were generated using a two-dimensional (2D) plane strain ion exchange (IOX) model, which is based on finite element modeling.

Example 1

A glass-based article formed from an alkali-alumino silicate glass substrate by ion exchange was modeled. The substrate had a base composition of: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$. The IOX included two steps. Step 1 was in a bath at a 380° C. bath temperature for 1 hour and 50 minutes, where the bath contained 38 wt. % Na and 62 wt. % K. Step 2 was in a bath at a temperature of 380° C. for 33 minutes, where the bath contained 9 wt. % Na and 91 wt. % K. The ion-exchanged metals therefore comprised K and Na. The article had a first section having a thickness of 0.6 millimeters and a second section having a thickness of 0.3 millimeters.

Comparative Example A

A glass-based article formed from an alkali-alumino silicate glass substrate by ion exchange was modeled. The substrate was produced in accordance with U.S. Pat. No. 9,156,724, which is incorporated herein by reference. The substrate had a base composition of: 57.43 mol % $SiO_2$, 16.10 mol % $Al_2O_3$, 17.05 mol % 2.81 mol % MgO, 0.003 mol % $TiO_2$, 6.54 mol % $P_2O_5$, and 0.07 mol % $SnO_2$. The simulated IOX included two steps. Step 1 was in a bath at a 450° C. bath temperature for 8 hours and 30 minutes, where the bath contained 51 wt. % Na and 49 wt. % K. Step 2 was in a bath at a 390° C. bath temperature for 14 minutes, where the bath contained 0.5 wt. % Na and 99.5 wt. % K. The ion-exchanged metals therefore comprised K and Na. The article had a first section having a thickness of 0.6 millimeters and a second section having a thickness of 0.3 millimeters.

Example 2

Figure 9:
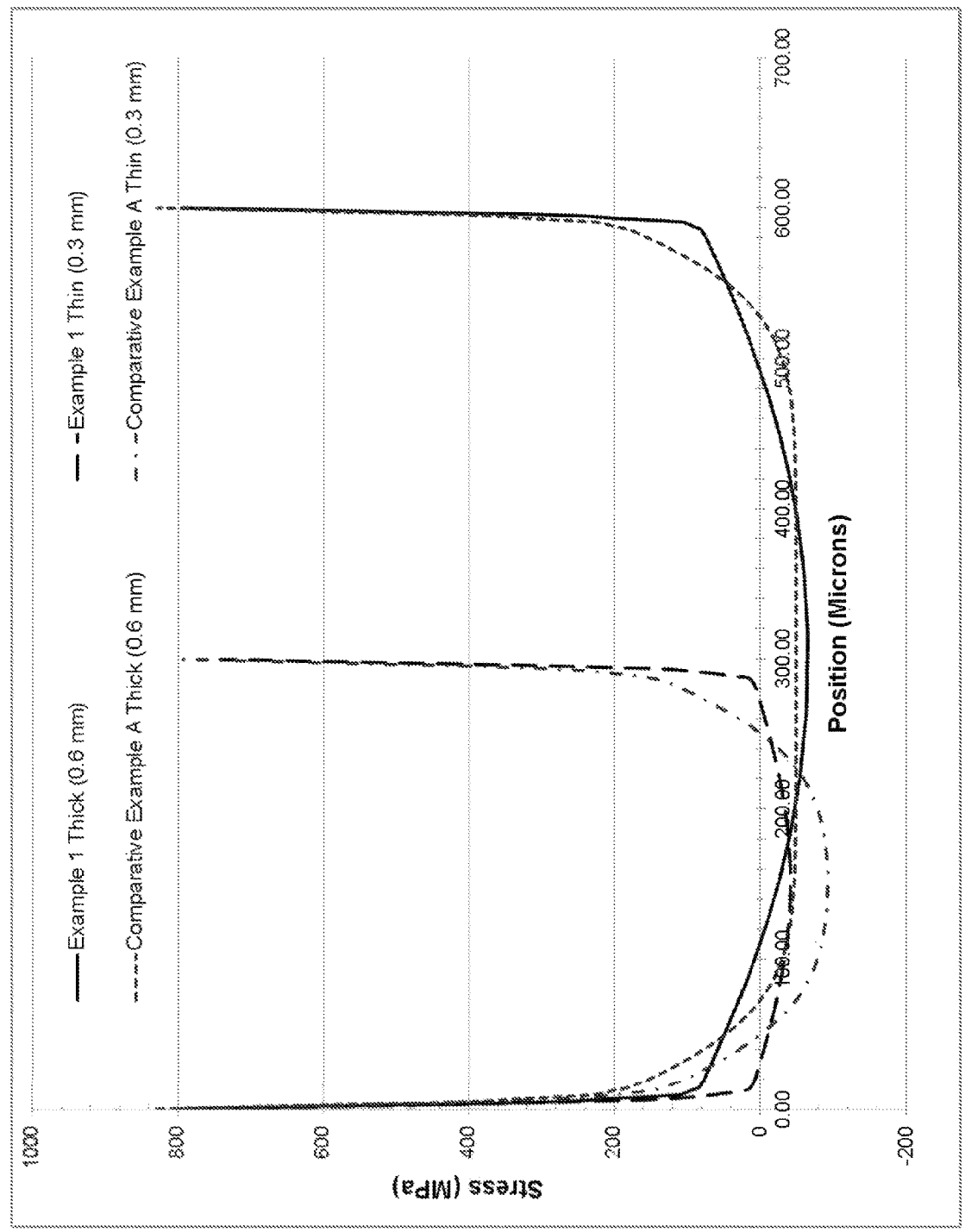
FIG. 9 is a graph of stress versus absolute position for Example 1 and Comparative Example A.
Figure 10:
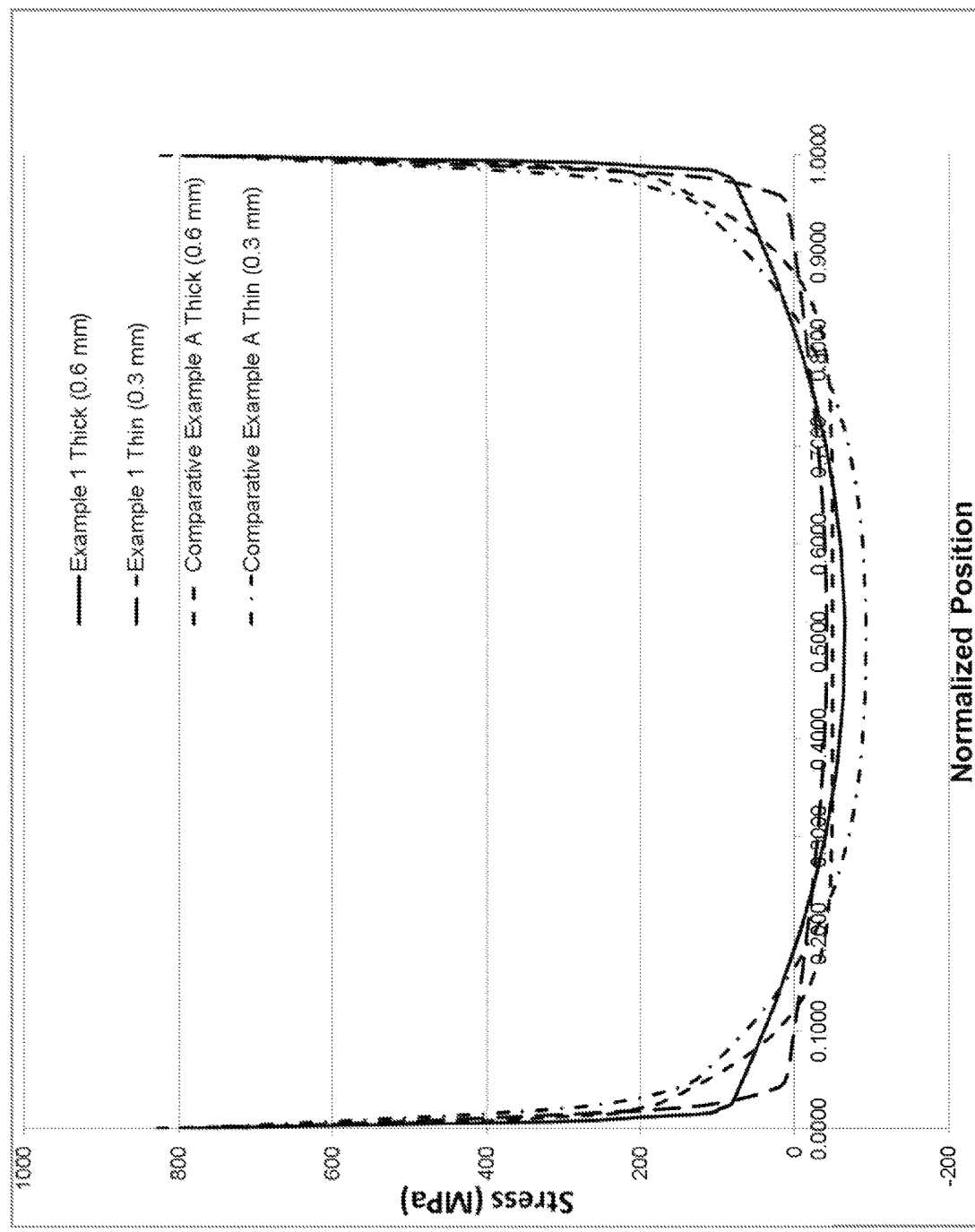
FIG. 10 is a graph of stress versus normalized position for Example 1 and Comparative Example A.
Figure 11:
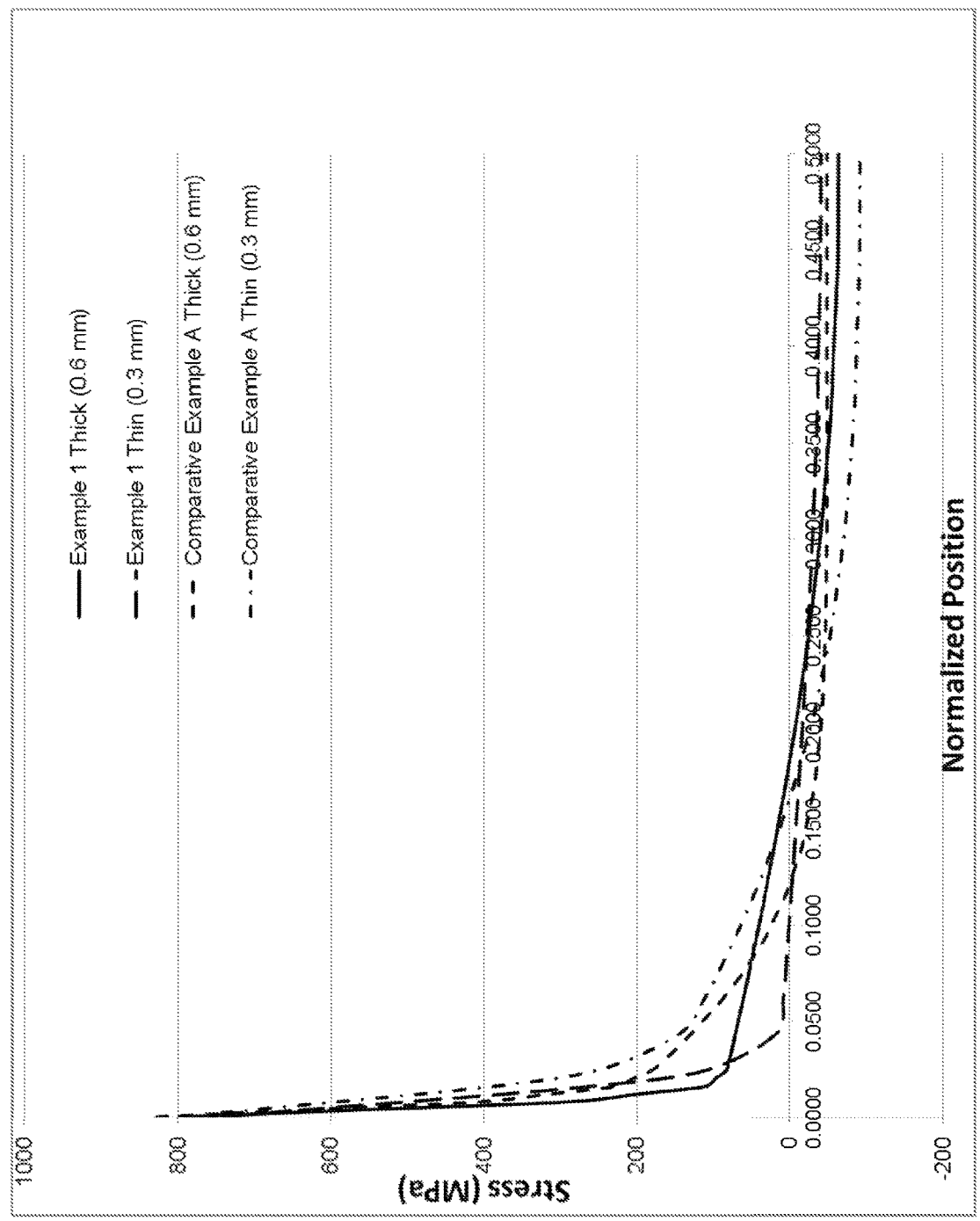
FIG. 11 is the graph of FIG. 10 enlarged to the center (0.5t) position.

Stress profiles for each section (thick and thin) of Example 1 and Comparative Example A are provided in FIGS. 9-11 in accordance with the 2D plane strain model. Stresses in MPa versus absolute position (microns) from the surface of the article are provided in FIG. 9, and stresses versus normalized position (z/h) are provided in FIGS. 10 and 11. FIG. 11 is an enlarged version of FIG. 10 to the center point (0.5h) of the article. Table 1 summarizes compressive stress (CS), maximum central tension ($CT_{max}$), and depth of compression (DOC) for each section of each example. The knee depth of each section of the samples is identified along with the compressive stress at the knee (CSk). Slope in a surface compressive stress region may be determined by a best fit line through the surface to the knee. Slope in an internal stress region may be determined by a best fit line from the knee to the center.

With respect to Example 1, CT in the thick section was −63 MPa, and CT in the thin section was −40 MPa. Thus, the CT is reduced in the thin section versus the thick section for the same IOX treatment. In contrast, for Comparative Example A, CT in the thick section was −49 MPa, and CT in the thin section was −93 MPa, and thus, the CT is increased in the thin section versus the thick section for the same IOX treatment. The thin section of Comparative Example A is frangible based on its maximum CT. To make the thin section of Comparative Example A non-frangible, the degree of IOX would need to be reduced in order to reduce maximum CT of the thin section, with the undesirable consequence of lower DOC in this thick section.

While the foregoing is directed to various embodiments, other and further embodiments of the disclosure may be devised without departing from the basic scope thereof, and the scope thereof is determined by the claims that follow.

What is claimed is:

1. A glass-based article comprising:
    a first section having a first thickness ($t_1$) and a first section surface;
    a second section having a second thickness ($t_2$), and a second section surface, wherein $t_2$ is less than $t_1$,
    a first stress profile of the first section comprising:
        a first compressive stress region;
        a first depth of compression ($DOC_1$); and
        a first central tension region comprising a first maximum central tension ($CT_1$);
    a second stress profile of the second section comprising:
        a second compressive stress region;
        a second depth of compression ($DOC_2$); and
        a second central tension region comprising a second maximum central tension ($CT_2$); and
    an alkali metal oxide having a first non-zero concentration that varies in the first section from the first section surface into at least a portion of $t_1$ and a second

TABLE 1

| | | Compressive Stress (CS) (MPa) | Maximum Central Tension ($CT_{max}$) (MPa) | DOC (microns) | Absolute Slope (MPa/micron) |
|---|---|---|---|---|---|
| Example 1 | 1st Section (0.6 mm) Surface (0 microns) for CS Center (337 microns) for CT | 800 | −63 | 113 (0.18h) | Compressive Stress Region 73.0 |
| | 1st Section Knee (9.42 microns) | 111 | — | — | Internal Stress Region 1.9 |
| | 2nd Section (0.3 mm) Surface (0 microns) for CS Center (175 microns) for CT | 745 | −40 | 31 (0.10h) | Compressive Stress Region 57.8 |
| | 2nd Section Knee (12.5 microns) | 22.7 | — | — | Internal Stress Region 0.4 |
| Comparative Example A | 1st Section (0.6 mm) Surface (0 microns) for CS Center (316 microns) for CT | 828 | −49 | 73 (0.12h) | Compressive Region 63.6 |
| | 1st Section Knee (9.42 microns) | 229 | — | — | Internal Region 0.9 |
| | 2nd Section(0.3 mm) Surface (0 microns) for CS Center (156 microns) for CT | 794 | −93 | 49.5 (0.16h) | Compressive Region 51.6 |
| | 2nd Section Knee (12.5 microns) | 150 | — | — | Internal Region 1.7 | non-zero concentration that varies in the second section from the second section surface into at least a portion of $t_2$;

wherein $|CT_2|$ is less than $|CT_1|$, $DOC_1 > 0.15 \cdot t_1$, and $DOC_2$ is in a range of $0.075 \cdot t_2$ to $0.15 \cdot t_2$.

2. The glass-based article of claim 1, including a soda-lime silicate, an alkali-aluminosilicate, an alkali-containing borosilicate, an alkali-containing aluminoborosilicate, or an alkali-containing phosphosilicate.

3. The glass-based article of claim 2, including a lithium-containing aluminosilicate.

4. The glass-based article of claim 1, wherein the second section is off-set from all edges of the glass-based article.

5. The glass-based article of claim 1, wherein $t_2$ is less than $t_1$ by at least 100 microns.

6. The glass-based article of claim 1, wherein $t_2$ is in the range of $0.05 \cdot t_1$ to $0.96 \cdot t_1$.

7. The glass-based article of claim 1, wherein $t_1$ is in the range of 0.3 mm to 2.5 mm, and $t_2$ is in the range of 0.025 mm to 2.4 mm.

8. The glass-based article of claim 1, wherein $DOC_1$ is less than or equal to $0.23 \cdot t_1$.

9. The glass-based article of claim 1, wherein the first stress profile further comprises a first surface compressive stress ($CS_1$) in the first compressive stress region of 450 MPa or more; and the second stress profile further comprises a second surface compressive stress ($CS_2$) in the second compressive stress region of 450 MPa or more.

10. The glass-based article of claim 1, wherein a portion of the first stress profile extends from the first section surface to a knee, wherein the knee is located at a depth from the first section surface in the range of about 2 to about 30 micrometers, and all points of the first stress profile located between the first section surface and the knee comprise a tangent having a value that is 10 MPa/micrometer or greater.

11. The glass-based article of claim 10, wherein a portion of the first stress profile extends from the knee to a first depth of compression ($DOC_1$), wherein all points of the first stress profile located between the knee and $DOC_1$ comprise a tangent having a value that is between about 0 and 2 MPa/micrometer.

12. The glass-based article of claim 1, wherein the alkali metal oxide comprises one or more of: lithium, potassium, and sodium.

13. The glass-based article of claim 1, further comprising one or more metals selected from the group consisting of: silver, copper, zinc, titanium, rubidium, and cesium.

14. The glass-based article of claim 1, wherein $DOC_1 > 0.18 \cdot t_1$.

15. A consumer electronic product comprising:

a housing having a front surface, a back surface, and side surfaces;

electrical components provided at least partially within the housing, the electrical components including at least a controller, a memory, and a display, the display being provided at or adjacent the front surface of the housing; and a cover plate disposed over the display;

wherein a portion of at least one of the housing and the cover plate comprises the glass-based article of claim 1.

16. A method of manufacturing a glass-based article comprising:

exposing a first section having a first thickness ($t_1$) and a first section surface and a second section having a second thickness ($t_2$) and a second section surface of a glass-based substrate to a bath comprising alkali metal ions to ion-exchange the glass-based substrate and form the glass-based article comprising an alkali metal oxide having a first non-zero concentration that varies in the first section from the first section surface into at least a portion of $t_1$ and a second non-zero concentration that varies in the second section from the second section surface into at least a portion of $t_2$;

wherein $t_2$ is less than $t_1$, and the glass-based article has a first stress profile of the first section comprising a first depth of compression ($DOC_1$) and a first central tension region comprising a first maximum central tension ($CT_1$) and a second stress profile of the second section comprising a second depth of compression ($DOC_2$) and a second central tension region comprising a second maximum central tension ($CT_2$), wherein $|CT_2|$ is less than $|CT_1|$, $DOC_1 > 0.15 \cdot t_1$, and $DOC_2$ is in a range of $0.075 \cdot t_2$ to $0.15 \cdot t_2$.

17. The method of claim 16, wherein the glass-based substrate is exposed to a first bath comprising alkali metal ions for a first duration, and subsequently to a second bath comprising alkali metal ions for a second duration.

18. The method of claim 16, wherein the glass-based substrate is a lithium-containing aluminosilicate and the bath comprises ions of potassium and sodium.

* * * * *